(12) United States Patent
Mahmood et al.

(10) Patent No.: US 11,616,432 B2
(45) Date of Patent: Mar. 28, 2023

(54) CONTROLLED ACTIVE SNUBBER IN CONVERTER POWER STAGE

(71) Applicant: Dr. Ing. h.c. F. Porsche Aktiengesellschaft, Stuttgart (DE)

(72) Inventors: Muhammad Mobeen Mahmood, Westfield, IN (US); Alexandre M. Reis, Kokomo, IN (US)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 225 days.

(21) Appl. No.: 16/941,763

(22) Filed: Jul. 29, 2020

(65) Prior Publication Data

US 2022/0037994 A1 Feb. 3, 2022

(51) Int. Cl.
*B60L 53/30* (2019.01)
*B60L 53/20* (2019.01)
*H02M 1/34* (2007.01)

(52) U.S. Cl.
CPC .............. *H02M 1/34* (2013.01); *B60L 53/20* (2019.02); *B60L 53/30* (2019.02); *B60L 2210/12* (2013.01); *H02M 1/344* (2021.05)

(58) Field of Classification Search
CPC ...... B60L 53/20; B60L 53/30; B60L 2210/12; H02M 1/342–344; H02M 1/34–348; H02M 3/33523; H02J 2207/20; H02J 7/0045; H03K 17/04123
USPC ......... 361/91.7, 91.1, 100; 327/471; 363/54, 363/57, 68
See application file for complete search history.

(56) References Cited

U.S. PATENT DOCUMENTS

| | | | |
|---|---|---|---|
| 5,828,559 A | 10/1998 | Chen | |
| 5,898,581 A | 4/1999 | Liu | |
| 6,980,447 B1* | 12/2005 | Schaible | H02M 3/33592 363/56.05 |
| 6,987,675 B2 | 1/2006 | Jovanovic et al. | |
| 10,277,107 B1* | 4/2019 | Iorio | H02M 1/083 |
| 10,679,823 B2* | 6/2020 | Mavretic | H04B 1/0458 |
| 11,017,983 B2* | 5/2021 | Mavretic | H03K 17/687 |
| 11,289,894 B2* | 3/2022 | Takuma | H02H 9/02 |
| 2008/0094866 A1 | 4/2008 | Bauman et al. | |
| 2017/0354455 A1 | 12/2017 | Smith et al. | |
| 2018/0025968 A1* | 1/2018 | Liu | H01L 29/66545 257/E21.409 |
| 2018/0115247 A1* | 4/2018 | Schekulin | H02M 3/33584 |

* cited by examiner

*Primary Examiner* — Elim Ortiz
(74) *Attorney, Agent, or Firm* — Leydig, Voit & Mayer, Ltd.

(57) ABSTRACT

A method for controlling an active snubber circuit includes measuring a gate voltage at a first transistor and measuring a gate voltage at a second transistor. The method also includes determining whether the first transistor and the second transistor are in the same state based on the gate voltage measured at the first transistor and the gate voltage measured at the second transistor. The method also includes, in response to a determination that the first transistor and the second transistor are in the same state, enabling the active snubber circuit. The method also includes, in response to a determination that the first transistor and the second transistor are not in the same state, disabling the enable signal. The method also includes disabling the active snubber circuit in response to the enable signal being disabled.

15 Claims, 6 Drawing Sheets

CONTROLLED ACTIVE SNUBBER IN CONVERTER POWER STAGE

TECHNICAL FIELD

This disclosure relates to controlled active snubbers for isolated converters and/or isolated converters having secondary synchronous rectifiers.

BACKGROUND

Vehicles, such as cars, trucks, sport utility vehicles, crossovers, mini-vans, or other suitable vehicles, include a powertrain system that includes, for example, a propulsion unit, a transmission, drive shafts, wheels, and other suitable components. The propulsion unit may include an internal combustion engine, a fuel cell, one or more electric motors, and the like. A hybrid vehicle may include a powertrain system comprising more than one propulsion unit. For example, a hybrid vehicle may include an internal combustion engine and an electric motor that cooperatively operate to propel the vehicle.

In an electric powered vehicle, such as a hybrid vehicle or purely electric vehicle, one or more batteries supply power to one or more electric motors of the electric powered vehicle. Such batteries may convert and/or transfer power to other batteries within the vehicle. For example, a primary battery array may convert and/or transfer power (e.g., in the form of electricity) to a secondary battery array. An electric grid may supply power to a battery charger circuit, which controls power flow to the one or more batteries in order to recharge the batteries.

SUMMARY

This disclosure relates generally to controlled active snubbers in isolated converter secondary power stages.

An aspect of the disclosed embodiments includes a system for controlling an active snubber circuit. The system includes a processor and a memory. The memory includes instructions that, when executed by the processor, cause the processor to: measure a gate voltage at a first transistor; measure a gate voltage at a second transistor; determine whether the first transistor and the second transistor are in the same state based on the gate voltage measured at the first transistor and the gate voltage measured at the second transistor; in response to a determination that the first transistor and the second transistor are in the same state, generate an enable signal; enable the active snubber circuit in response to the enable signal being generated; in response to a determination that a subsequently measured gate voltage of the first transistor and a subsequently measured gate voltage of the second transistor indicates that the first transistor and the second transistor are not in the same state, disable the enable signal; and disable the active snubber circuit in response to the enable signal being disabled.

Another aspect of the disclosure embodiments includes a method for controlling an active snubber circuit. The method includes measuring a gate voltage at a first transistor and measuring a gate voltage at a second transistor. The method also includes determining whether the first transistor and the second transistor are in the same state based on the gate voltage measured at the first transistor and the gate voltage measured at the second transistor. The method also includes, in response to a determination that the first transistor and the second transistor are in the same state, generating an enable signal and enabling the active snubber circuit in response to the enable signal being generated. The method also includes, in response to a determination that a subsequently measured gate voltage of the first transistor and a subsequently measured gate voltage of the second transistor indicates that the first transistor and the second transistor are not in the same state, disabling the enable signal. The method also includes disabling the active snubber circuit in response to the enable signal being disabled.

Another aspect of the disclosure embodiments includes an apparatus for controlling an active snubber circuit. The apparatus includes a controller configured to: measure a gate voltage at a first transistor; measure a gate voltage at a second transistor; determine whether the first transistor and the second transistor are in the same state based on the gate voltage measured at the first transistor and the gate voltage measured at the second transistor; in response to a determination that the first transistor and the second transistor are in the same state, generate an enable signal; enable the active snubber circuit in response to the enable signal being generated; selectively adjust a duty cycle of a third transistor and a duty cycle of a fourth transistor to provide a desired current to a snubber inductor; in response to a determination that a subsequently measured gate voltage of the first transistor and a subsequently measured gate voltage of the second transistor indicates that the first transistor and the second transistor are not in the same state, disable the enable signal; disable the active snubber circuit in response to the enable signal being disabled; discharge current from the snubber inductor through the fourth transistor.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, or other suitable vehicles, may include various automatic vehicle propulsion control systems, such as cruise control, adaptive cruise control, and the like. Typically, such systems receive input from a driver that indicates a desired vehicle speed. The automatic vehicle propulsion control systems typically interact with various vehicle components, such as a throttle, brake system, and the like, to achieve the desired speed.

In an electric powered vehicle, such as a hybrid vehicle or purely electric vehicle, one or more batteries supply power to one or more electric motors of the electric powered vehicle. Such batteries may transfer power to other batteries within the vehicle. For example, a primary battery array may transfer power (e.g., electricity) to a secondary battery array. An electric grid may supply power to a battery charger circuit, which controls power flow to the one or more batteries in order to recharge the batteries. For example, an operator of the vehicle may electrically connect the battery charger of the vehicle to an electrical outlet connected to the electric grid. Power may be transferred from the electric grid to the battery charger. The battery charger may then provide power to one or more of the batters of the vehicle.

Figure 3:
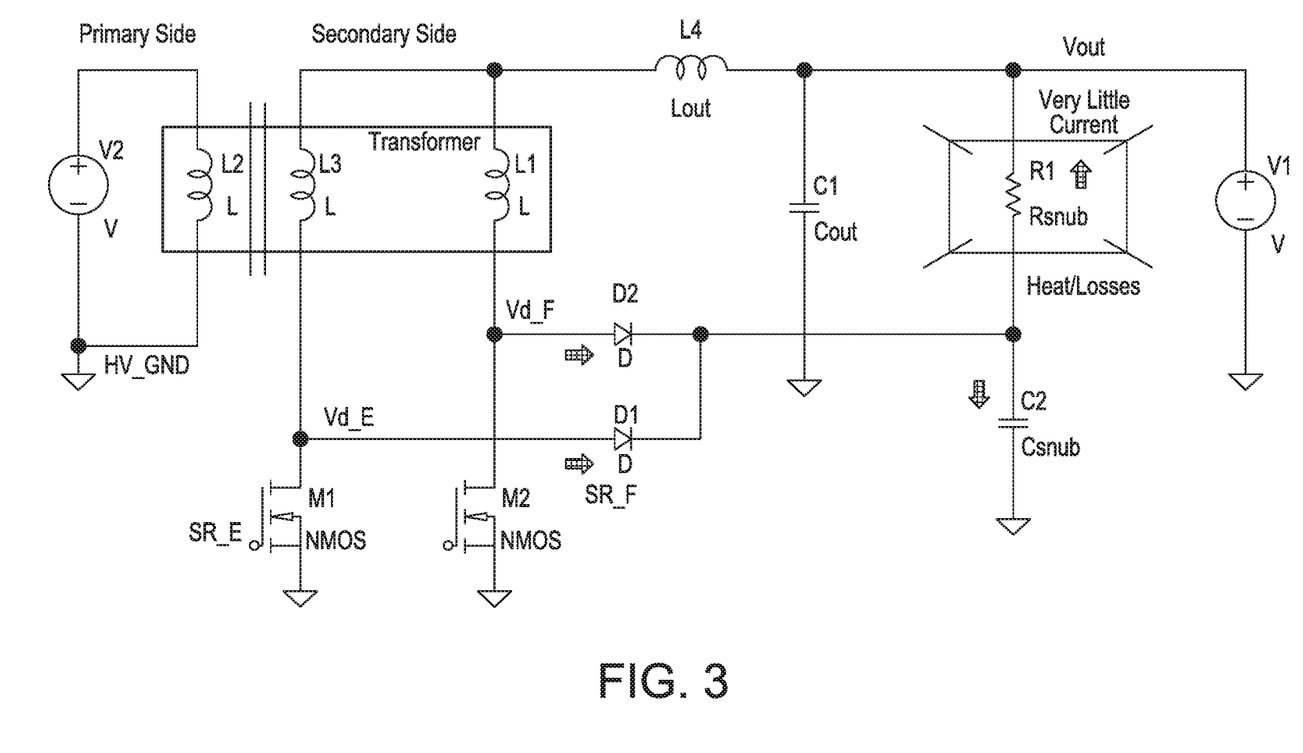
FIG. 3 generally illustrates a converter according to the principles of the present disclosure.

Typically, in circuits associated with such battery chargers, as is generally illustrated in FIG. 3, transformer leakage and parasitic loop inductances in conjunction with transformer winding and transistor (e.g., such as a metal-oxide-semiconductor field-effect transistor (MOSFET)) output capacitances resonates and may cause voltage spikes at a switch nodes Vd_E and Vd_F of synchronous rectifiers SR_E and SR_F. The synchronous rectifies may be clamped by a setup including diodes D1 and D2 connected to a snubber capacitor Csnub and a resistor Rsnub (e.g., which may be referred to as a DRC snubber). Csnub may be capable of taking the instantaneous overshoot voltage of the switching synchronous rectifiers SR_E and SR_F and store the overshoot voltage as a charge.

In such typical circuits, as charge builds up in Csnub, during clamping of SR_E and SR_F overshoot, the voltage at Csnub increases. The voltage at Csnub is then consumed by Rsnub, which may cause Rsnub to generate heat and a relatively small load current. This typically results in additional losses and temperature increase of the circuit. Further, Rsnub current is not a controlled parameter, and snubbing action of the circuit is uncontrolled, may result in an inability to control losses or clamping voltage based on operating conditions.

As such, typical circuits, such as those generally illustrated in FIG. 3, may be relatively lossy, have inferior clamping action, and may not provide control of losses and clamping voltage under various operating conditions. Accordingly, systems and methods, such as those described herein, that are configured to provide a controllable active snubber circuit, may be desirable. In some embodiments, the systems and methods described herein may be configured to a buck stage topology for actively clamping the voltage spikes at the switching nodes Vd_E and Vd_F caused by the resonance between leakage inductance in the transformer, parasitic loop inductance in conjunction with transformer, and MOSFET output capacitances. The systems and methods described herein may be configured to allow voltage spikes to charge up the snubber capacitor, Csnub, which may is a large enough charge to be considered a constant voltage source for the active snubber input.

In some embodiments, as is generally illustrated in FIGS. 3A and 3B, the systems and methods described herein may be configured to enable the active snubber during a period when both SR_E and SR_F are on (e.g., conducting) to discharge Csnub. The systems and methods described herein may be configured to disable the active snubber when either SR_E or SR_F turns off (e.g., is no longer conducting) to clamp the Vds_E or Vds_F voltage. In some embodiments, the systems and methods described herein may be configured to provide a step down or buck topology converter configured to convert an undesired voltage overshoot at the Vd_E and Vd_F nodes into usable controlled load current. Additionally, or alternatively, the systems and methods described herein may be configured to perform the voltage clamping action at the Vd_E and Vd_F nodes to a relatively low value without increase power losses (e.g., as compared to Rsnub used in a DRC snubber).

In some embodiments, the systems and methods described herein may be configured to provide enable logic (e.g., using an enable logic circuit and/or software). The enable logic may be configured to determine when both SR_E and SR_F start conducting, and may generate a signal to enable the active snubber. The systems and methods described herein may be configured to, under an enable condition, discharge current stored in Csnub to charge up the buck snubber inductor when the HSD MOSFET of snubber is on. The systems and methods described herein may be configured to, when the snubber HSD MOSFET turns off, turn on an LSD snubber MOSFET, which allows the buck snubber inductor current to discharge through the LSD snubber FET. The snubber HSD MOSFET and LSD MOSFET turn on and off complementarily multiple times in during the enable condition (e.g., depending on a switching frequency of the snubber). The systems and methods described herein may be configured to allow the remaining buck snubber inductor current (e.g., if not discharged completely) to discharge through a body diode of LSD MOSFET once the active snubber is disabled (e.g., in the disable state, the buck snubber, HSD MOSFET, and LSD MOSFET switches are in a high impedance state (open)).

In some embodiments, the systems and methods described herein may be configured to operate the active snubber with a switching frequency similar or higher than Lout ripple current frequency. For example, the switching frequency may be twice or more than a switching frequency of an inductively coupled converter. The systems and methods described herein may be configured to operate at closed loop current control to control the current into the buck snubber inductor and the output of the active snubber.

In some embodiments, the systems and methods described herein may be configured to provide a controlled active snubber that includes diodes, a capacitor, and a buck type converter. The systems and methods described herein may be configured to reduce losses as an amount of capacitor energy converted into load current to be reused to feed battery loads or charge a battery is processed through a buck converter stage. The buck converter may have a relatively low output impedance compared to the Rsnub in the DRC snubber.

In some embodiments, the systems and methods described herein may be configured to adjust a current of an inductor of the active snubber using a setpoint to control the overshoots at the Vd_E and Vd_F nodes to desired clamping voltages. For example at higher converter input voltages, the Vd_E and Vd_F nodes will have higher voltage spikes, which may require higher current to be passed through the active snubber (e.g., such that the Csnub meets the charge balance at a lower steady state voltage) to clamp Vd_E and Vd_F nodes at significantly lower voltages below the SR_E and SR_F breakdown voltages. This condition may dissipate maximum power in the active snubber. Conversely, at lower converter input voltages, the Vd_E and Vd_F nodes may have lower voltage spikes, which may allow for a lower current through the active snubber to clamp the Vd_E and Vd_F nodes at acceptable voltages below the breakdown voltages of SR_E and SR_F (e.g., which may dissipate less power in active snubber). Accordingly, the efficiency of the system may be controlled based on the operating conditions, allowing only enough snubber losses to prevent Vd_E and Vd_F exceeding breakdown limits.

In some embodiments, the systems and methods described herein may be configured to clamp the synchronous rectifiers SR_E and SR_F drain to source voltages Vd_E and Vd_F to a lower level than the typical DRC snubber (e.g., for a comparable snubber power loss). The systems and methods described herein may be configured to improve efficiency of an active snubber. The active snubber may provide a greater value of current to be passed through the buck snubber converter to discharge the capacitor Csnub, such that Csnub meets the charge balance at lower steady state voltage, thereby providing improved clamping performance for a given power loss. The active snubber may provide improved efficiency over the conventional DRC snubber for a similar current passed through conventional DRC resistor or active snubber. Current of the active snubber may be controllable, which may provide benefits under various operating conditions. For example, at higher input converter voltages, the systems and methods described herein may use a higher current value command setpoint for improved voltage clamping, which may result in higher active snubber power losses and a decreased overall converter efficiency. Conversely, at lower input converter voltages, the systems and methods described herein may use a lower value current command setpoint, which may reduce the active snubber power losses and may improve overall converter efficiency.

In some embodiments, the systems and methods described herein may be configured to measure a gate voltage at a first transistor. The systems and methods described herein may be configured to measure a gate voltage at a second transistor. The systems and methods described herein may be configured to determine whether the first transistor and the second transistor are in the same state based on the gate voltage measured at the first transistor and the gate voltage measured at the second transistor.

The systems and methods described herein may be configured to, in response to a determination that the first transistor and the second transistor are in the same state, generate an enable signal. The systems and methods described herein may be configured to enable the active snubber circuit in response to the enable signal being generated. The systems and methods described herein may be configured to selectively adjust a duty cycle of a third transistor and a duty cycle of a fourth transistor to provide a desired current to a snubber inductor.

The systems and methods described herein may be configured to, in response to a determination that a subsequently measured gate voltage of the first transistor and a subsequently measured gate voltage of the second transistor indicates that the first transistor and the second transistor are not in the same state, disable the enable signal. The systems and methods described herein may be configured to disable the active snubber circuit in response to the enable signal being disabled. The systems and methods described herein may be configured to discharge current from the snubber inductor through the fourth transistor.

In some embodiments, voltage stored in a capacitor of the active snubber circuit discharges in response to the active snubber circuit being enabled. In some embodiments, the voltage discharged from the capacitor charges a snubber inductor of the active snubber circuit. In some embodiments, current of the snubber inductor of the active snubber circuit is discharged through the fourth transistor in response to the enable signal being disabled.

In some embodiments, the gate voltage measured at the first transistor indicates that the first transistor is conducting and the gate voltage measured at the second transistor indicates that the second transistor is conducting. In some embodiments, the gate voltage measured at the first transistor indicates that the first transistor is not conducting and the gate voltage measured at the second transistor indicates that the second transistor is not conducting.

Figure 1:
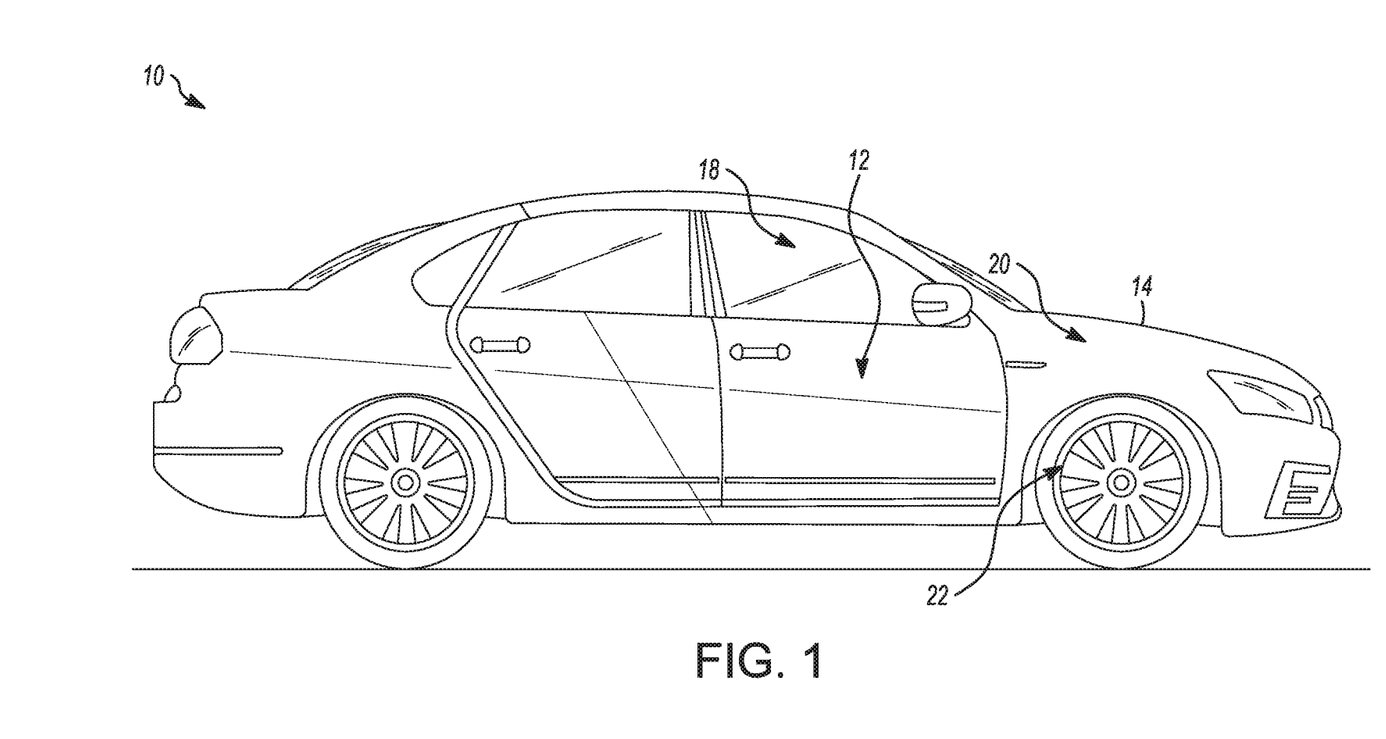
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle When the vehicle 10 includes one or more electric motors, a vehicle battery, and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery. The vehicle 10 may include additional or fewer features than those generally illustrated and/or disclosed herein.

Figure 2:
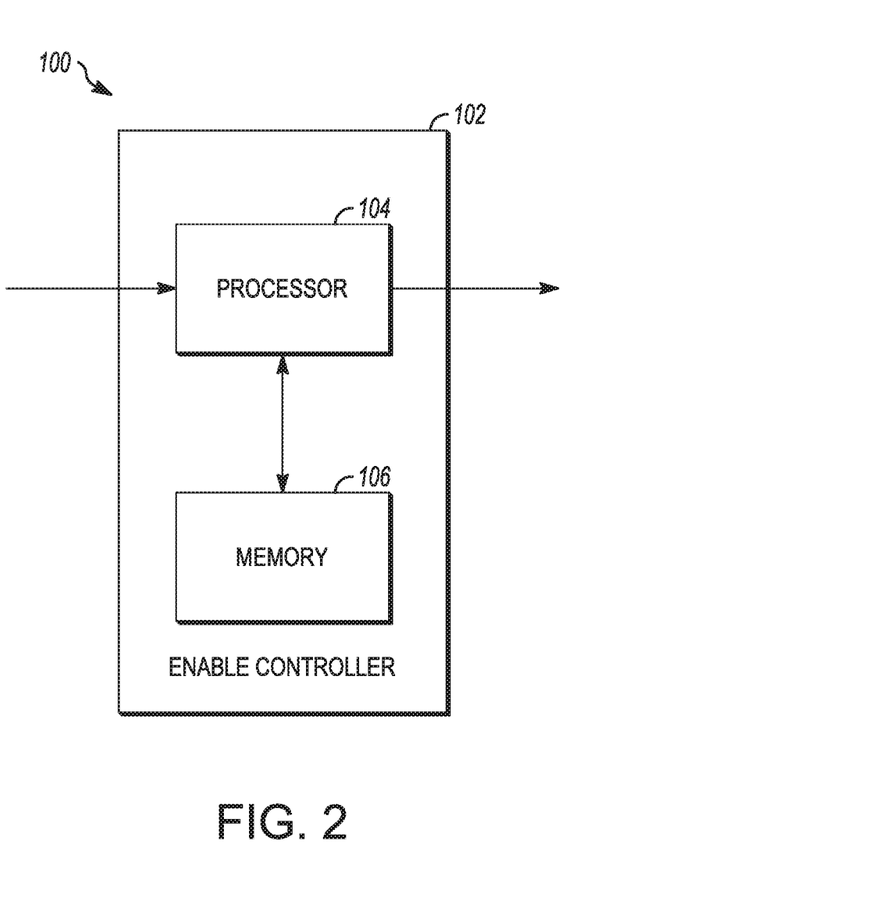
FIG. 2 generally illustrates an active snubber control system according to the principles of the present disclosure.

FIG. 2 generally illustrates an active snubber control system 100 according to the principles of the present disclosure. The system 100 may be configured to control an active snubber circuit, such as those generally illustrated in FIGS. 4A and 4B. The active snubber circuit may correspond to a battery charger configured to provide at least some energy, in the form of electric charge, to one or more batteries of the vehicle 10.

Figure 4A:
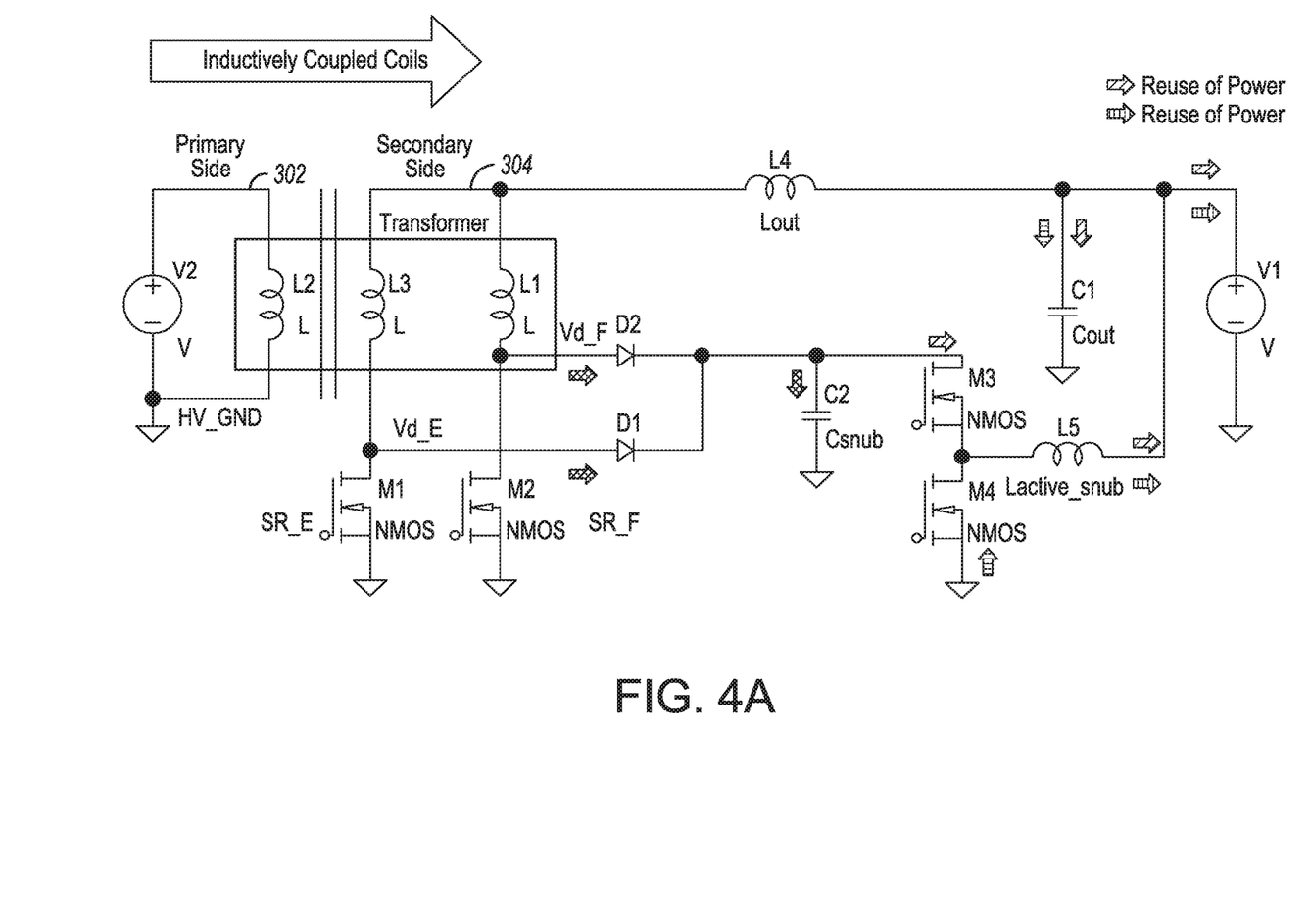
FIG. 4A generally illustrates a controlled active snubber according to the principles of the present disclosure.
Figure 4B:
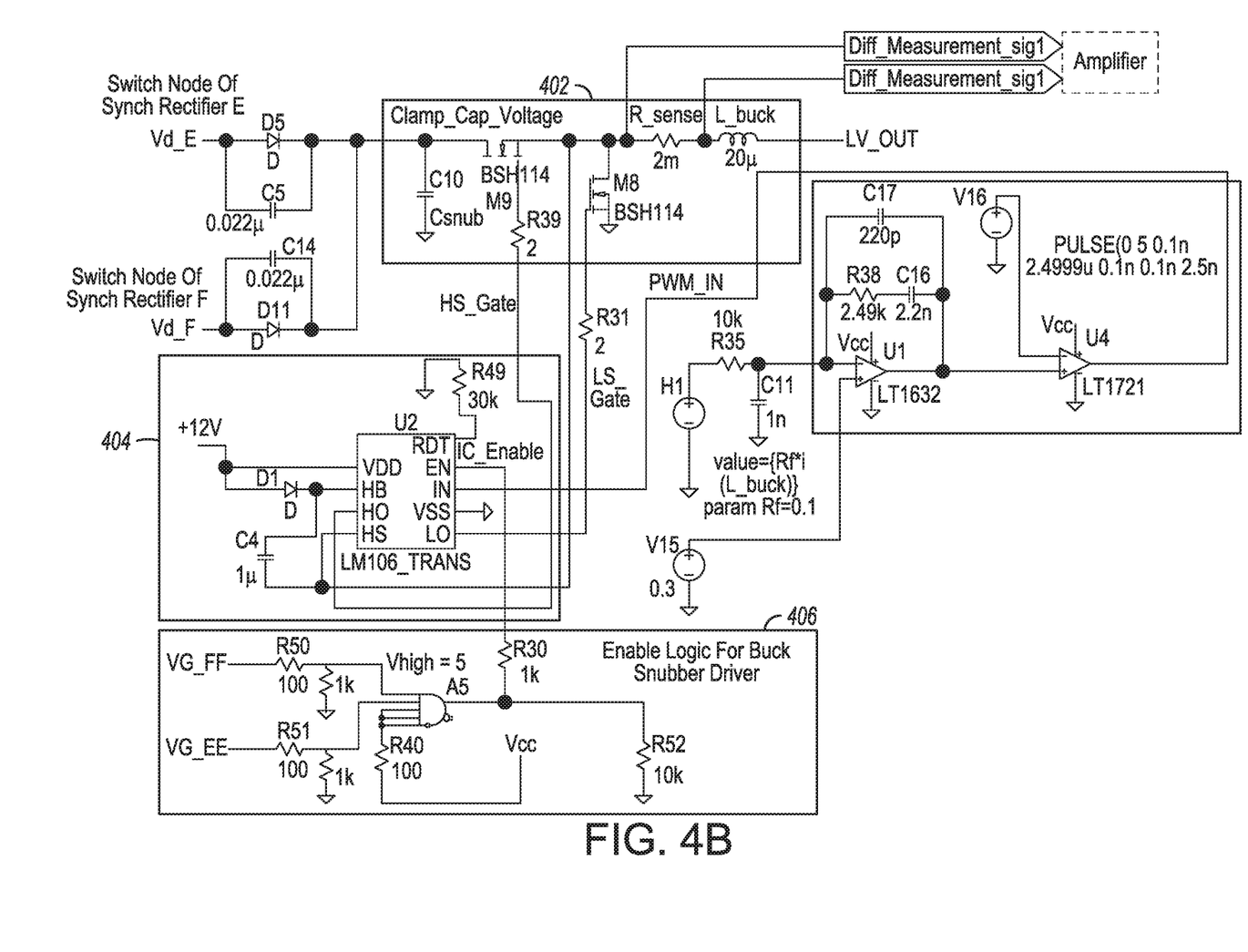
FIG. 4B generally illustrates a detailed view of the controlled active snubber of FIG. 3.

The system 100 may include an enable controller 102. The controller 102 may include a processor 104 and a memory 106. The processor 104 may include any suitable processor, such as those described herein. Additionally, or alternatively, the controller 102 may include any suitable number of processors, in addition to or other than the processor 104. The memory 106 may comprise a single disk or a plurality of disks (e.g., hard drives), and includes a storage management module that manages one or more partitions within the memory 106. In some embodiments, memory 106 may include flash memory, semiconductor (solid state) memory or the like. The memory 106 may include Random Access Memory (RAM), a Read-Only Memory (ROM), or a combination thereof. The memory 106 may include instructions that, when executed by the processor 104, cause the processor 104 to, at least, control the active snubber generally illustrated in FIGS. 4A and 4B. In some embodiments, the enable controller 102 includes an enable logic circuit as is generally illustrated in FIG. 4B.

In some embodiments, in response to power being provided to the active snubber (e.g., via the electric grid, or other suitable power supply providing power to the battery charger) the controller 102 may be configured to determine whether a first transistor (e.g. referred to as SR_E and M1 in FIGS. 4A and 4B) of the active snubber circuit is conducting by measuring a gate voltage at the first transistor. The first transistor may include a MOSFET or other suitable transistor. The controller 102 may be configured to determine whether a second transistor (e.g. referred to as SR_F and M2 in FIGS. 4A and 4B) of the active snubber circuit is conducting by measuring a gate voltage at the second transistor. The second transistor may include a MOSFET or other suitable transistor.

The controller 102 may determine whether the first transistor is conducting based on the gate voltage measured at the first transistor. If the controller 102 determines that the first transistor is conducting, the controller 102 may determine whether the second transistor is conducting based on the gate voltage measured at the second transistor. If the controller 102 determines that the second transistor is conducting (e.g., both the first transistor and the second transistor are conducting or on), the controller 102 may generate an enable signal. The enable signal may include any suitable signal, such as a high voltage signal, a low voltage signal, a flag set in a memory, a bit sequence, or any other suitable signal. In some embodiments, the controller 102 may generate the enable signal in response to a determination that the first transition and the second transistor are in the same state. For example, the controller 102 may determine whether the first transistor and the second transistor are conducing. If the controller 102 determines that both the first transistor and the second transistor are conducting, the controller 102 generates the enable signal. Conversely, the controller 102 may determine whether the first transistor and the second transistor are not conducting. If the controller 102 determines that both the first transistor and the second transistor are not conducting, the controller 102 generates the enable signal.

The controller 102 may enable the active snubber in response to generating (e.g., which may be referred to as enabling) the enable signal. The active snubber may discharge voltage stored in an input buck capacitor (e.g., referred to as Csnub in FIGS. 4A and 4B) while the enable signal is enabled. The controller 102 may selectively control a duty cycle of a third transistor (referred to as M3 in FIG. 4A) and a duty cycle of a fourth transistor (referred to as M4 in FIG. 4A) to provide a desired current to the snubber inductor (referred to as L5 in FIG. 4A). The controller 102 controls the duty cycles of the third transistor and the fourth transistor, such that the third transistor and the fourth transistor operator complimentarily (e.g., one is on while the other is off). The voltage discharged from the capacitor may be provided to and is stored in a snubber inductor (e.g., referred to as Lbuck in FIGS. 4A and 4B) in the form of magnetic energy.

In some embodiments, the controller 102 may measure a subsequent gate voltage at the first transistor and a subsequent gate voltage at the second transistor. The controller 102 may determine whether, based on the subsequent gate voltage at the first transistor and the subsequent gate voltage at the second transistor, indicate that the first transistor and the second transistor are not in the same state. If the controller 102 determines that the first transistor and the second transistor are not in the same state, the controller 102 disables the enable signal. The controller 102 may discharge the current stored in the snubber inductor L5 is through the fourth transistor (referred to as M4).

In some embodiments, the system 100 and/or the controller 102 may perform the methods described herein. However, the methods described herein as performed by the system 100 and/or the controller 102 are not meant to be limiting, and any type of software executed on a controller can perform the methods described herein without departing from the scope of this disclosure. For example, a controller, such as a processor executing software within a computing device, can perform the methods described herein.

Figure 5:
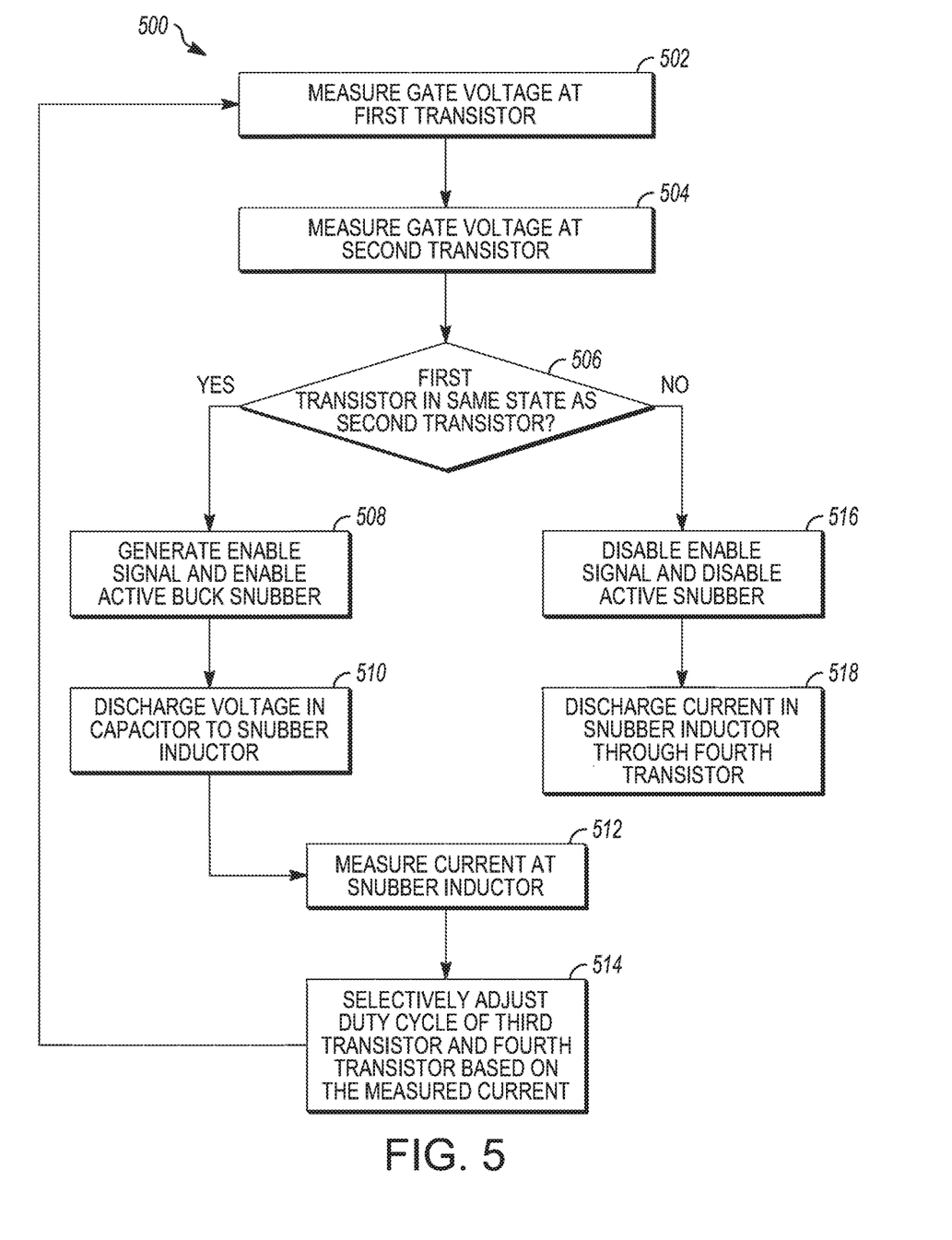
FIG. 5 is a flow diagram generally illustrating an active snubber circuit control method according to the principles of the present disclosure.

FIG. 5 is a flow diagram generally illustrating an active snubber circuit control method 500 according to the principles of the present disclosure. At 502, the method 500 measures a gate voltage at a first transistor. For example, the controller 102 measures the gate voltage at the first transistor, referred to as M1 in FIG. 4A.

At 504, the method 500 measures a gate voltage at a second transistor. For example, the controller 102 measures the gate voltage at the second transistor, referred to as M2 in FIG. 4A.

At 506, the method 500 determines whether the first transistor is in the same state as the second transistor. For example, the controller 102 determines whether the gate voltage measured at the first transistor indicates that the first transistor is conducting. If the controller 102 determines that the voltage measured at the first transistor indicates that the first transistor is conducting, the controller 102 determines whether the gate voltage measured at the second transistor indicates that the second transistor is conducting. The controller 102 determines that the first transistor and the second transistor are in the same state if the controller 102 determines that the gate voltage measured at the first transistor indicates that the first transistor is conducting and that the gate voltage measured at the second transistor indicates that the second transistor is conducting. Additionally, or alternatively, the controller 102 may determine whether the gate voltage measured at the first transistor indicates that the first transistor is not conducting and that the gate voltage measured at the second transistor indicates that the second transistor is not conducting. If the controller 102 determines that the gate voltage measured at the first transistor indicates that the first transistor is not conducting and that the gate voltage measured at the second transistor indicates that the second transistor is not conducting, the controller 102 determines that the first transistor and the second transistor are in the same stage (e.g., not conducting). If the controller 102 determines that the first transistor and the second transistor are in the same stage, the method 500 continues at 508. If the controller 102 determines that the first transistor and the second transistor are not in the same state (e.g., one is conducting and one is not conducting), the method 500 continues at 516.

At 508, the method 500 generates an enable signal and enables an active snubber. For example, the controller 102 generates the enable signal (e.g., which may be referred to as enabling the enable signal). The controller 102 enables the active snubber (e.g., which may be referred to as a buck snubber) in response to the enable signal being enabled (e.g., or generated).

At 510, the method 500 discharges voltage in a capacitor to a snubber inductor. For example, the voltage stored in the capacitor Csnub of the active snubber is discharged. The voltage discharged from the capacitor is provided to the snubber inductor (e.g., referred to as L5 in FIG. 4A)

At 512, the method 500 measures a current at the snubber inductor. For example, the controller 102 measures current at the snubber inductor L5.

At 514, the method 500 selectively adjusts a duty cycle of a third transistor and a fourth transistor based on the measured current. For example, the controller 102 selectively adjusts a duty cycle of a third transistor, referred to as M3 in FIG. 4A, and a duty cycle of a fourth transistor, referred to as M4 in FIG. 4A, based on the measured current at the snubber inductor L5 to regulate average inductor current and provide the average inductor current to the load. For example, the controller 102 may be configured to control an average current at the snubber inductor L5. The average current may represent a desired current, an amount of current appropriate for a load connected to the circuit via the snubber inductor L5, or any suitable current. The controller 102 adjusts the duty cycle of the third transistor and the duty cycle of the fourth transistor, such that the third transistor and the fourth transistor operator complementarily (e.g., one is off while the other is on) for a period that allows the average current at the snubber inductor L5. In some embodiments, the desired current at the snubber inductor maybe a fixed current. For example, the circuit may include an open loop circuit and the controller 102 may omit measuring the current at the snubber inductor and, accordingly, may not adjust the duty cycle of the third transistor and the fourth transistor. The method continues at 502.

At 516, the method 500 disables the enable signal and disables the active snubber. For example, the controller 102 disables the enable signal and disables the active snubber in response to the first transistor and the second transistor being in different states.

At 518, the method 500 discharges current in the snubber inductor through the fourth transistor. For example, the controller 102 selectively controls the snubber indictor to allow current to flow in a loop through the fourth transistor a.

In some embodiments, a system for controlling an active snubber circuit includes a processor and a memory. The memory includes instructions that, when executed by the processor, cause the processor to: measure a gate voltage at a first transistor; measure a gate voltage at a second transistor; determine whether the first transistor and the second transistor are in the same state based on the gate voltage measured at the first transistor and the gate voltage measured at the second transistor; in response to a determination that the first transistor and the second transistor are in the same state, generate an enable signal; enable the active snubber circuit in response to the enable signal being generated; in response to a determination that a subsequently measured gate voltage of the first transistor and a subsequently measured gate voltage of the second transistor indicates that the first transistor and the second transistor are not in the same state, disable the enable signal; and disable the active snubber circuit in response to the enable signal being disabled.

In some embodiments, voltage stored in a capacitor of the active snubber circuit discharges in response to the active snubber circuit being enabled. In some embodiments, the voltage discharged from the capacitor charges a snubber inductor of the active snubber circuit. In some embodiments, an average current of a snubber inductor of the active snubber circuit is provided to a load in response to the active snubber circuit being enabled. In some embodiments, the gate voltage measured at the first transistor indicates that the first transistor is conducting and the gate voltage measured at the second transistor indicates that the second transistor is conducting. In some embodiments, the gate voltage measured at the first transistor indicates that the first transistor is not conducting and the gate voltage measured at the second transistor indicates that the second transistor is not conducting. In some embodiments, the instructions further cause the processor to selectively adjust a duty cycle of a third transistor and a duty cycle of a fourth transistor in response to the enable signal being generated. In some embodiments, the adjusted duty cycle of the third transistor and the adjusted duty cycle of the fourth transistor provides a desired current to a snubber inductor of the active snubber circuit. In some embodiments, the active snubber circuit corresponds to a vehicle battery charging system. In some embodiments, the first transistor includes a metal-oxide-semiconductor field-effect transistor. In some embodiments, the second transistor includes a metal-oxide-semiconductor field-effect transistor.

In some embodiments, a method for controlling an active snubber circuit includes measuring a gate voltage at a first transistor and measuring a gate voltage at a second transistor. The method also includes determining whether the first transistor and the second transistor are in the same state based on the gate voltage measured at the first transistor and the gate voltage measured at the second transistor. The method also includes, in response to a determination that the first transistor and the second transistor are in the same state, generating an enable signal and enabling the active snubber circuit in response to the enable signal being generated. The method also includes, in response to a determination that a subsequently measured gate voltage of the first transistor and a subsequently measured gate voltage of the second transistor indicates that the first transistor and the second transistor are not in the same state, disabling the enable signal. The method also includes disabling the active snubber circuit in response to the enable signal being disabled.

In some embodiments, voltage stored in a capacitor of the active snubber circuit discharges in response to the active snubber circuit being enabled. In some embodiments, the voltage discharged from the capacitor charges a snubber inductor of the active snubber circuit. In some embodiments, an average current of a snubber inductor of the active snubber circuit is provided to a load in response to the active snubber circuit being enabled. In some embodiments, the gate voltage measured at the first transistor indicates that the first transistor is conducting and the gate voltage measured at the second transistor indicates that the second transistor is conducting. In some embodiments, the gate voltage measured at the first transistor indicates that the first transistor is not conducting and the gate voltage measured at the second transistor indicates that the second transistor is not conducting. In some embodiments, the method also includes selectively adjusting a duty cycle of a third transistor and a duty cycle of a fourth transistor in response to the enable signal being generated. In some embodiments, the adjusted duty cycle of the third transistor and the adjusted duty cycle of the fourth transistor provides a desired current to a snubber inductor of the active snubber circuit.

In some embodiments, an apparatus for controlling an active snubber circuit includes a controller configured to: measure a gate voltage at a first transistor; measure a gate voltage at a second transistor; determine whether the first transistor and the second transistor are in the same state based on the gate voltage measured at the first transistor and the gate voltage measured at the second transistor; in response to a determination that the first transistor and the second transistor are in the same state, generate an enable signal; enable the active snubber circuit in response to the enable signal being generated; selectively adjust a duty cycle of a third transistor and a duty cycle of a fourth transistor to provide a desired current to a snubber inductor; in response to a determination that a subsequently measured gate voltage of the first transistor and a subsequently measured gate voltage of the second transistor indicates that the first transistor and the second transistor are not in the same state, disable the enable signal; disable the active snubber circuit in response to the enable signal being disabled; discharge current from the snubber inductor through the fourth transistor.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a general-purpose computer or general-purpose processor with a computer program that, when executed, carries out any of the respective methods, algorithms, and/or instructions described herein. In addition, or alternatively, for example, a special purpose computer/processor may be utilized which may contain other hardware for carrying out any of the methods, algorithms, or instructions described herein.

Further, all or a portion of implementations of the present disclosure may take the form of a computer program product accessible from, for example, a computer-usable or computer-readable medium. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A system for controlling an active snubber circuit, the system comprising:
 a processor; and
 a memory including instructions that, when executed by the processor, cause the processor to:
  measure a gate voltage at a first transistor;
  measure a gate voltage at a second transistor;
  determine whether the first transistor and the second transistor are in the same state based on the gate voltage measured at the first transistor and the gate voltage measured at the second transistor;
  in response to a determination that the first transistor and the second transistor are in the same state, generate an enable signal;
  enable the active snubber circuit in response to the enable signal being generated;
  in response to a determination that a subsequently measured gate voltage of the first transistor and a subsequently measured gate voltage of the second transistor indicates that the first transistor and the second transistor are not in the same state, disable the enable signal; and
  disable the active snubber circuit in response to the enable signal being disabled,
 wherein the first transistor and second transistors are configured as synchronous rectifiers of a converter and coupled to a transformer,
 wherein the active snubber circuit is coupled to the first transistor and the second transistor,
 wherein the instructions further cause the processor to selectively adjust a duty cycle of a third transistor and a duty cycle of a fourth transistor in response to the enable signal being generated,
 wherein the adjusted duty cycle of the third transistor and the adjusted duty cycle of the fourth transistor provides a desired current to a snubber inductor of the active snubber circuit,
 wherein the desired current is predetermined according to an input voltage of the converter,
 wherein the active snubber circuit further comprises the third transistor, the fourth transistor, and a capacitor,
 wherein a first terminal of the capacitor is coupled to the first transistor and the second transistor via at least one diode, and the first terminal of the capacitor is coupled to an input of the third transistor,
 wherein an output of the third transistor is coupled to an input of the fourth transistor and a terminal of the snubber inductor, and
 wherein the third transistor and the fourth transistor are configured to discharge the capacitor based on the adjusted duty cycle to provide the current to the snubber inductor.

2. The system of claim 1, wherein the system is configured such that voltage stored in the capacitor of the active snubber circuit discharges in response to the active snubber circuit being enabled, wherein the capacitor of the active snubber circuit is coupled to the synchronous rectifiers via at least one diode.

3. The system of claim 2, wherein the system is configured such that the voltage discharged from the capacitor charges the snubber inductor of the active snubber circuit.

4. The system of claim 1, wherein the system is configured such that an average current of the snubber inductor of the active snubber circuit is provided to a load in response to the active snubber circuit being enabled.

5. The system of claim 1, wherein the gate voltage measured at the first transistor indicates that the first transistor is conducting and the gate voltage measured at the second transistor indicates that the second transistor is conducting.

6. The system of claim 1, wherein the gate voltage measured at the first transistor indicates that the first transistor is not conducting and the gate voltage measured at the second transistor indicates that the second transistor is not conducting.

7. The system of claim 1, wherein the active snubber circuit corresponds to a vehicle battery charging system.

8. The system of claim 1, wherein the first transistor includes a metal-oxide-semiconductor field-effect transistor.

9. The system of claim 1, wherein the second transistor includes a metal-oxide-semiconductor field-effect transistor.

10. A method for controlling an active snubber circuit, the method comprising:
 measuring a gate voltage at a first transistor;
 measuring a gate voltage at a second transistor;
 determining whether the first transistor and the second transistor are in the same
 state based on the gate voltage measured at the first transistor and the gate voltage measured at the second transistor;
 in response to a determination that the first transistor and the second transistor are in the same state, generating an enable signal;
 enabling the active snubber circuit in response to the enable signal being generated;
 in response to a determination that a subsequently measured gate voltage of the first transistor and a subsequently measured gate voltage of the second transistor indicates that the first transistor and the second transistor are not in the same state, disabling the enable signal; and
 disabling the active snubber circuit in response to the enable signal being disabled,
 wherein the first transistor and second transistors are configured as synchronous rectifiers of a converter and coupled to a transformer, and
 wherein the active snubber circuit is coupled to the first transistor and the second transistor,
 wherein the method further comprises selectively adjusting a duty cycle of a third transistor and a duty cycle of a fourth transistor in response to the enable signal being generated,
 wherein the adjusted duty cycle of the third transistor and the adjusted duty cycle of the fourth transistor provides a desired current to a snubber inductor of the active snubber circuit,
 wherein the desired current is predetermined according to an input voltage of the converter,
 wherein the active snubber circuit comprises the third transistor, the fourth transistor, and a capacitor,
 wherein a first terminal of the capacitor is coupled to the first transistor and the second transistor via at least one diode, and the first terminal of the capacitor is coupled to an input of the third transistor, wherein an output of the third transistor is coupled to an input of the fourth transistor and a terminal of the snubber inductor, and wherein the third transistor and the fourth transistor are configured to discharge the capacitor based on the adjusted duty cycle to provide the current to the snubber inductor.

11. The method of claim 10, wherein voltage stored in the capacitor of the active snubber circuit discharges in response to the active snubber circuit being enabled.

12. The method of claim 11, wherein the voltage discharged from the capacitor charges the snubber inductor of the active snubber circuit.

13. The method of claim 10, wherein an average current of the snubber inductor of the active snubber circuit is provided to a load in response to the active snubber circuit being enabled.

14. The method of claim 10, wherein the gate voltage measured at the first transistor indicates that the first transistor is conducting and the gate voltage measured at the second transistor indicates that the second transistor is conducting.

15. The method of claim 10, wherein the gate voltage measured at the first transistor indicates that the first transistor is not conducting and the gate voltage measured at the second transistor indicates that the second transistor is not conducting.

* * * * *